3,337,532
PREPARATION OF MIXED CELLULOSE POLYOL ETHER NITRATES
Yves Lacroix and Nives Bugat, Bergerac, Dordogne, France, assignors to Etat Francais represente par le Ministre des Armees, Delegation Ministerielle pour l'Armement (Direction des Poudres), Paris, France
No Drawing. Filed May 23, 1963, Ser. No. 282,545
Claims priority, application France, June 5, 1962, 899,683
11 Claims. (Cl. 260—222)

This invention relates to a novel class of compounds definable as nitrates of a mixed ether of cellulose and a polyol and its general object is to prepare compounds of this class in an efficient, economical and controllable manner.

The novel compounds, which are generally thermoplastic in character have been found to possess various advantageous properties not found in similar combination or to a comparable extent in any compounds heretofore available, and should have valuable applications in various fields of industry, including impregnation of paper, leather and other organic materials, as well as in the explosives field.

Generally, according to the invention nitrates of a mixed ether of cellulose and a polyol are obtained by reacting a mono- or poly-halohydrin of a selected polyol, with alkali-cellulose, thereby producing a mixed ether of cellulose and the polyol, and then nitrating said mixed ether. The term "halohydrin" is used herein to denote any hydrohalic ester of a polyol.

Examples of polyol halohydrins, usable according to the invention include among any others, the chlorohydrins of glycol, glycerol, sorbitol, mannitol, erythritol and polyvinyl alcohols.

The alkali-cellulose is preferably prepared by dipping a wood pulp sheet material in a caustic soda solution of about 14 to 15% concentration for a period of about 2 to 4 hours at a temperature of about from 15 to 20° C., whereupon the pulp sheets swell and form the alkali cellulose ($2C_6H_{10}O_5$,NaOH). The swollen sheets are then compressed to drain excess liquid until their weight is about three times that of the initial cellulose.

The polyol halohydrin is preferably used in solution in a suitable solvent such as acetone, petroleum ether, dioxan, or the like, wherein the cellulose-to-solvent ratio is about 1/10.

The etherification reaction is conducted with a gradual heating to 50–70° C., for a period of about 4–5 hours, the precise conditions depending on the particular halohydrin used.

Preferably, the mixed ether thus obtained is washed with water and/or with an alcohol such as methyl alcohol, ethyl alcohol, isopropyl alcohol or the like, then is dried prior to nitration. The mixed ether is then nitrated, e.g., by means of a sulfuric-nitric acid mixture.

The invention will now be illustrated by some examples.

*Example 1*

An alkali cellulose obtained in the manner described above is mixed in a double-walled Werner mixer with a solution of glycerol monochlorohydrin in acetone. Instead of a Werner mixer, a sealed Bonnet-Calad kneading trough may be used. The following ratios are used:

(Anhydro-glucose pattern in the cellulose chain)/(glycerol chlorohydrin molecules) = 1/1.5.
Cellulose/acetone = 1/10.

The temperature is gradually raised from 25 to 50° C. and the etherification is allowed to proceed five hours.

The resulting glyceryl-cellulose is washed with 80% ethyl alcohol, then isopropyl alcohol, and is dried.

The anhydro-glucose pattern contains 3 etherifiable hydroxyls. In the above indicated conditions, only 0.8 of the hydroxyls present in the pattern have reacted. In other words, the substitution ratio is 0.8.

The glyceryl cellulose is then nitrated with a sulfuric-nitric acid mixture, washed and stabilized. The nitration reaction is performed using the ratio: modified cellulose/bath = 1/50. The reaction time is in the range from 30 minutes to 2 hours. The reaction temperature is 30° C., though it is often found convenient to impregnate the modified cellulose in the nitration bath at 0° C., then allow the temperature to rise gradually. The stabilization step can be performed by treating with water at 100° C. or in an autoclave, or by extraction with isopropyl alcohol.

The nitrogen ratio of the resulting glyceryl cellulose and its solubility in the usual solvents depend on the sulfuric-nitric acid mixture used. For purposes of comparison, four different sulfuric-nitric acid mixtures were used, as indicated in the following table, which also states the nitrogen ratio of the resulting glyceryl-cellulose nitrate and its solubility in acetone:

|  | Composition of mixture | | | |
|---|---|---|---|---|
|  | No. 1, Percent | No. 2, Percent | No. 3, Percent | No. 4, Percent |
| Sulfuric acid | 45.2 | 56.4 | 44.1 | 66.5 |
| Nitric acid | 31.0 | 24.4 | 39.5 | 23.0 |
| Water | 23.8 | 19.2 | 16.4 | 10.5 |
| Nitrogen | 10.2 | 11.3 | 12.4 | 13.2 |
| Solubility in acetone | (1) | (2) | (2) | (2) |

[1] Insoluble, poorly-nitrated portions present.
[2] Highly soluble.

The glyceryl cellulose nitrate obtained with the use of the sulfuric-nitric acid mixture Nos. 2, 3 and 4 are highly soluble in the usual solvent and are thermoplastic at 95–100° C.

The molar ratio of anhydroglucose to glyceryl chlorohydrin (hydrochloric ester of a polyol) may be varied as from 1:1 to 1:3. The substitution ratio, i.e., the proportion of reacted hydroxyls in the anhydro-glucose pattern, increases with the amount of chlorohydrin used, as indicated by the following:

(Anhydroglucose pattern in cellulose chain)/(glycerol chlorohydrin molecule) ratio: 1:1.0; 1:1.5; 1:2.0.
Substitution ratio: 0.38; 0.83; 0.83.

The thermo-plasticity also increases with the substitution ratio.

*Example 2*

The same procedure as in Example 1 is used except that 10% of the monochlorohydrin used is replaced with di-chlorohydrin. The resulting glyceryl-cellulose nitrate is thermoplastic but is insoluble in the usual solvents.

Instead of glyceryl chlorohydrin, the chlorohydrin of glycol, sorbitol, erythritol, and polyvinyl alcohols can be used under generally similar conditions. When glycol chlorohydrin is used, the results are very similar to those obtained with glycerol chlorohydrin. Where the operating conditions are the same as in Example 1, a substitution ratio approaching unity is obtained. On nitration, there is obtained a hydroxyethyl-cellulose nitrate somewhat less thermoplastic than the glyceryl-cellulose nitrate.

The nitrates of a mixed ether of cellulose and polyols prepared according to the invention may or may not be soluble in the usual solvents, but are in all cases substantially thermoplastic. The plastic temperature range can be reduced through the additon of small quantities of plasticizers, e.g., between 80 and 100° C.

Generally speaking, the compounds obtained according to the invention from cellulose as modified with the polychlorohydrin, will still contain some chloride ions and hence be less flammable than nitro-cellulose.

The novel compounds of the invention can be prepared into thermoplastic aqueous suspensions for the impregnation of various substances such as paper, leather, and the like. They are also usable as explosives, being similar in this respect to cellulose nitrate, while being free from the objectionable migration and exudation of the latter when stored in block form.

It will be understood that the procedures, compositions and applications specifically mentioned hereinabove are illustrative rather than restrictive and that various changes may be made therein within the scope of the invention. The chlorohydrin can be replaced with bromohydrins and other halohydrins. Instead of sulfuric-nitric acid baths, other nitrating bath compositions may be used, for high nitrogen ratios, such as phosphoric-nitric acid mixtures and the like. Various other changes will occur to those familiar with the art.

What we claim is:

1. A method of preparing a nitrate of a mixed ether of cellulose and a polyol selected from the group consisting of glycol, glycerol, sorbitol, mannitol, erythritol and polyvinyl alcohol comprising the steps of gradually heating to a temperature of about 50–70° C. an halohydrin of said polyol and alkali cellulose to form an ether of said polyol and cellulose and then nitrating said ether.

2. A method according to claim 1 in which said halohydrin of said polyol is a chlorohydrin.

3. A method according to claim 1 wherein the molar ratio of polyol halohydrin per anhydro-glucose unit of cellulose is from 1:1 to 5:1.

4. A method according to claim 3 wherein said ratio is about 1.5:1.

5. A method according to claim 1, wherein the alkali cellulose is produced by immersing sheet wood pulp in a caustic soda solution to form alkali-cellulose, and pressing the swollen wood pulp sheets until their weight is about 3 times that of the initial cellulose.

6. A method according to claim 1, wherein said polyol halohydrin is used as a solution in an organic solvent.

7. A method according to claim 6, wherein the cellulose/solvent ratio is about 1:10.

8. A method according to claim 1, wherein the gradual heating of the reagents up to about 50–70° C. is continued for about 4 to 5 hours during the etherification reaction.

9. A method according to claim 1, including the further step of washing the resulting mixed ether, and drying, prior to nitration.

10. A novel composition of matter comprising a nitrate of a mixed ether of cellulose and a polyol, prepared by the process of claim 1.

11. A novel composition of matter comprising the nitrate of glyceryl cellulose prepared by the process of claim 1.

No references cited.

DONALD E. CZAJA, *Primary Examiner.*

LEON J. BERCOVITZ, *Examiner.*

R. W. MULCAHY, *Assistant Examiner.*